(12) United States Patent
Goldstein

(10) Patent No.: US 9,595,730 B2
(45) Date of Patent: Mar. 14, 2017

(54) FLOW BATTERY AND USAGE THEREOF

(71) Applicant: Jonathan R. Goldstein, Jerusalem (IL)

(72) Inventor: Jonathan R. Goldstein, Jerusalem (IL)

(73) Assignee: Epsilor-Electric Fuel LTD., Bet Shemesh (IL)

( * ) Notice: Subject to any disclaimer, the term of this patent is extended or adjusted under 35 U.S.C. 154(b) by 147 days.

(21) Appl. No.: 14/308,069

(22) Filed: Jun. 18, 2014

(65) Prior Publication Data

US 2015/0048777 A1   Feb. 19, 2015

(30) Foreign Application Priority Data

Aug. 14, 2013   (IL) .......................................... 227961

(51) Int. Cl.
| | |
|---|---|
| *H01M 10/44* | (2006.01) |
| *H01M 10/46* | (2006.01) |
| *H01M 8/18* | (2006.01) |
| *H01M 4/58* | (2010.01) |
| *H01M 8/04* | (2016.01) |
| *H01M 8/20* | (2006.01) |
| *H02J 7/00* | (2006.01) |
| *H02J 7/35* | (2006.01) |

(52) U.S. Cl.
CPC ......... *H01M 8/188* (2013.01); *H01M 4/5825* (2013.01); *H01M 8/04186* (2013.01); *H01M 8/04201* (2013.01); *H01M 8/04208* (2013.01); *H01M 8/20* (2013.01); *H01M 10/46* (2013.01); *H01M 10/465* (2013.01); *H02J 7/0042* (2013.01); *H02J 7/355* (2013.01); *H01M 2250/10* (2013.01); *H01M 2250/20* (2013.01); *Y02B 90/14* (2013.01); *Y02E 60/528* (2013.01); *Y02T 90/32* (2013.01)

(58) Field of Classification Search
USPC ................................................ 320/101, 137
See application file for complete search history.

(56) References Cited

U.S. PATENT DOCUMENTS

| | | | |
|---|---|---|---|
| 4,180,623 A | 12/1979 | Adams | |
| 5,434,020 A | 7/1995 | Cooper | |
| 5,472,807 A | 12/1995 | Light | |
| 5,939,798 A * | 8/1999 | Miller | ..................... H02J 9/062 |
| | | | 307/43 |
| 8,808,888 B2 * | 8/2014 | Wilson | ................ H01M 8/0232 |
| | | | 429/72 |
| 2012/0052347 A1 | 3/2012 | Wilson et al. | |

(Continued)

FOREIGN PATENT DOCUMENTS

| | | |
|---|---|---|
| CA | 1174728 | 9/1984 |
| EP | 0070349 | 1/1983 |

(Continued)

OTHER PUBLICATIONS

Wikipedia: http://en.wikipedia.org/wiki/Flow_battery.

(Continued)

*Primary Examiner* — Nghia Doan
(74) *Attorney, Agent, or Firm* — Robert G. Lev

(57) ABSTRACT

A voltaic cell comprising an iron in alkali anode where metal iron is oxidized to iron II hydroxide and a ferricyanide in alkali cathode where ferricyanide is reduced to ferrocyanide, and uses thereof.

17 Claims, 7 Drawing Sheets

(56) References Cited

U.S. PATENT DOCUMENTS

| | | | | |
|---|---|---|---|---|
| 2012/0133323 A1* | 5/2012 | Gomez | ............... | B60L 11/1879 |
| | | | | 320/101 |
| 2012/0244406 A1* | 9/2012 | Xia | .................... | H01M 2/1653 |
| | | | | 429/107 |
| 2013/0149615 A1* | 6/2013 | Narayan | ................. | H01M 4/12 |
| | | | | 429/405 |
| 2015/0274555 A1* | 10/2015 | Volkel | ................... | C02F 1/4691 |
| | | | | 205/746 |

FOREIGN PATENT DOCUMENTS

| WO | WO9724774 | 7/1997 |
|---|---|---|
| WO | WO/01/21856 | 3/2001 |
| WO | WO/03/043170 Y | 5/2003 |
| WO | WO2009035935 | 3/2009 |

OTHER PUBLICATIONS

I.M. Kolthoff and E.A. Pearson, Stability of Potassium Ferrocyanide Solutions, American Chemical Society, Oct. 15, 1931, p. 381, Analytical Edition vol. 3.
Hollandsworth, Zegarski, and Selman, Zinc/Ferricyanide Battery Development Phase 4 Final Report, 1985, p. 2.5.
Hollandsworth, Zegarski, and Selman, Zinc/Ferricyanide Battery Development Phase 4 Final Report, 1985, p. 2.6.

\* cited by examiner

FLOW BATTERY AND USAGE THEREOF

PRIORITY INFORMATION

The present application claims priority to Israeli Patent Application No: 227961 filed Aug. 14, 2013.

BACKGROUND

Field of the Disclosure

The present invention relates to fuel cells and batteries and in particular to flow batteries for the rechargeable generation of electricity.

Description of the Related Art

Flow batteries are rechargeable fuel cells in which electrolyte containing one or more dissolved electro-active species flows through an electrochemical cell that reversibly converts chemical energy directly to electricity. Additional electrolyte is stored externally, generally in one or more storage tanks, and is usually pumped through the cell (or cells) of the reactor, although gravity feed systems are also known. Flow batteries can be rapidly "recharged" by replacing the electrolyte liquid; the spent material being simultaneously recovered and reenergized.

Various classes of flow batteries exist. One type of flow battery is the redox (reduction-oxidation) flow battery, which is a reversible fuel cell in which all electro-active components are dissolved in the electrolyte. The redox flow battery is a secondary fuel cell or regenerative fuel cell, meaning that it may be recharged. Essentially chemical energy is converted to electrical energy, and by passing a reverse current, the battery may be recharged.

Flow batteries where one or more electro-active components are deposited as a solid layer are known as hybrid flow batteries. Such electrochemical cells contain one battery electrode (solid phase) and one fuel cell electrode. An example of a hybrid flow battery is the zinc-bromine battery that may be used for energy storage, where the zinc anode is the solid phase electrode and dissolved bromine is the cathode component.

The main difference between the Redox type and the hybrid type of flow batteries is that as with other fuel cells, the energy of the redox flow battery is fully decoupled from the power because the energy is related to the electrolyte volume, i.e. to the tank size, whereas the power is determined by the electrode area. However, as with typical batteries, the energy of the hybrid flow battery is limited by the size of the battery electrodes.

In the simplest form a flow battery or cell comprises two solutions separated by an ion selective membrane, where each solution is in contact with a catalytic electrode and is capable of being pumped by or through that electrode (the flow) for storage in separate tanks.

Traditional hybrid flow batteries are a subclass of lower cost flow batteries in which only one redox solution is used; the other electrode comprising an active metal that is precipitated on charge from the salt solution. One example of a hybrid flow battery is iron/ferric chloride using acidic solutions in which iron is deposited at the anode current collector on charge. Other examples include zinc-bromine, zinc-cerium and lead-acid flow batteries.

U.S. Pat. No. 4,180,623 to Adams (Lockheed) describes an example of a hybrid flow battery based on zinc/sodium ferricyanide, that uses alkaline solutions. Here zinc is deposited at the anode current collector on charge. On discharge, the zinc dissolves into solution.

Hybrid flow battery systems still require two pumps and two tanks and often have limited cycle life or poor energy efficiency due to metal dendrite formation and excessive parasitic hydrogen evolution on charging.

BRIEF SUMMARY

A first aspect of the invention is directed to a voltaic cell comprising an iron in alkali anode where metal iron is oxidized to iron II hydroxide on discharge and a ferricyanide in alkali cathode where ferricyanide (trivalent iron) is reduced to ferrocyanide (divalent iron) on discharge.

The cell reaction can be written: $Fe+2FeIII(CN)_6^{3-}+2OH^-=2FeII(CN)_6^{4-}+Fe(OH)_2$. The alkaline electrolyte is selectable from the group consisting of sodium hydroxide, potassium hydroxide, lithium hydroxide and mixtures thereof.

The cathode may be a catalytic porous structure, comprising nickel or carbon, that facilitates the redox process of conversion from ferrocyanide to ferricyanide on charge and the reverse reaction on discharge. Furthermore, a separator, such as an ion selective membrane may be placed between the anode and cathode to prevent free access of ferricyanide to the iron anode —which would cause self discharge.

The voltaic cell may further comprise a pump and storage tank for pumping and storing the ferricyanide and/or ferrocyanide solutions. In one embodiment the storage tank may be divided into two compartments using for example, a flexible impervious barrier, so that only charged ferricyanide solution from one compartment is fed to the cells for discharge while the discharged ferrocyanide solution exiting the cells is fed for storage into the second compartment.

Typically the voltaic cell is rechargeable.

A second aspect is directed to a battery comprising a plurality of voltaic cells, each comprising an iron in alkali anode where metal iron is oxidized to iron II hydroxide and a ferricyanide in alkali cathode where ferricyanide is reduced to ferrocyanide.

In some embodiments, the battery may comprise a different number of input and output cells. Such a battery may be used for power conversion between one voltage and another voltage.

In some embodiments, the battery comprises at least one pump and storage tank for pumping and storing at least one of the ferricyanide and ferrocyanide solutions.

In some embodiments, the battery may be configured as a DC/DC power converter.

In some embodiments, the battery may further comprise a switching gear and may be configured as one of the group consisting of AC/DC, AC/AC and DC/AC converters.

A third aspect is directed to a UPS comprising a voltaic cell that comprises an iron in alkali anode where metal iron is oxidized to iron II hydroxide and a ferricyanide in alkali cathode where ferricyanide is reduced to ferrocyanide.

A fourth aspect is directed to a vehicle comprising a wheeled chassis and a voltaic cell that comprises an iron in alkali anode where metal iron is oxidized to iron II hydroxide and a ferricyanide in alkali cathode where ferricyanide is reduced to ferrocyanide.

A fifth aspect is directed to providing a stand-alone power system comprising a voltaic power cell that comprises an iron in alkali anode where metal iron is oxidized to iron II hydroxide and a ferricyanide in alkali cathode where ferricyanide is reduced to ferrocyanide coupled to at least one of the group comprising a solar panel and a wind turbine.

A sixth aspect is directed to a method of generating electricity comprising oxidizing metallic iron to iron II hydroxide at an anode of a battery and reducing ferricyanide to ferrocyanide at a cathode of the battery.

A seventh aspect is directed to a method of storing electricity comprising reducing iron II hydroxide to metallic iron at an anode of a flow battery and oxidizing ferrocyanide to ferricyanide at a cathode of the flow battery, thereby charging the flow battery.

An eighth aspect is directed to a method of load balancing an electricity grid comprising storing excess electrical power during off-peak hours in a flow battery comprising a voltaic cell that comprises an iron in alkali anode where metal iron is oxidized to iron II hydroxide and a ferricyanide in alkali cathode where ferricyanide is reduced to ferrocyanide, and releasing electrical power during peak demand periods.

BRIEF DESCRIPTION OF THE DRAWINGS

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

In the drawings, like components are generally designated by like reference numerals, wherein.

DETAILED DESCRIPTION

Figure 1:
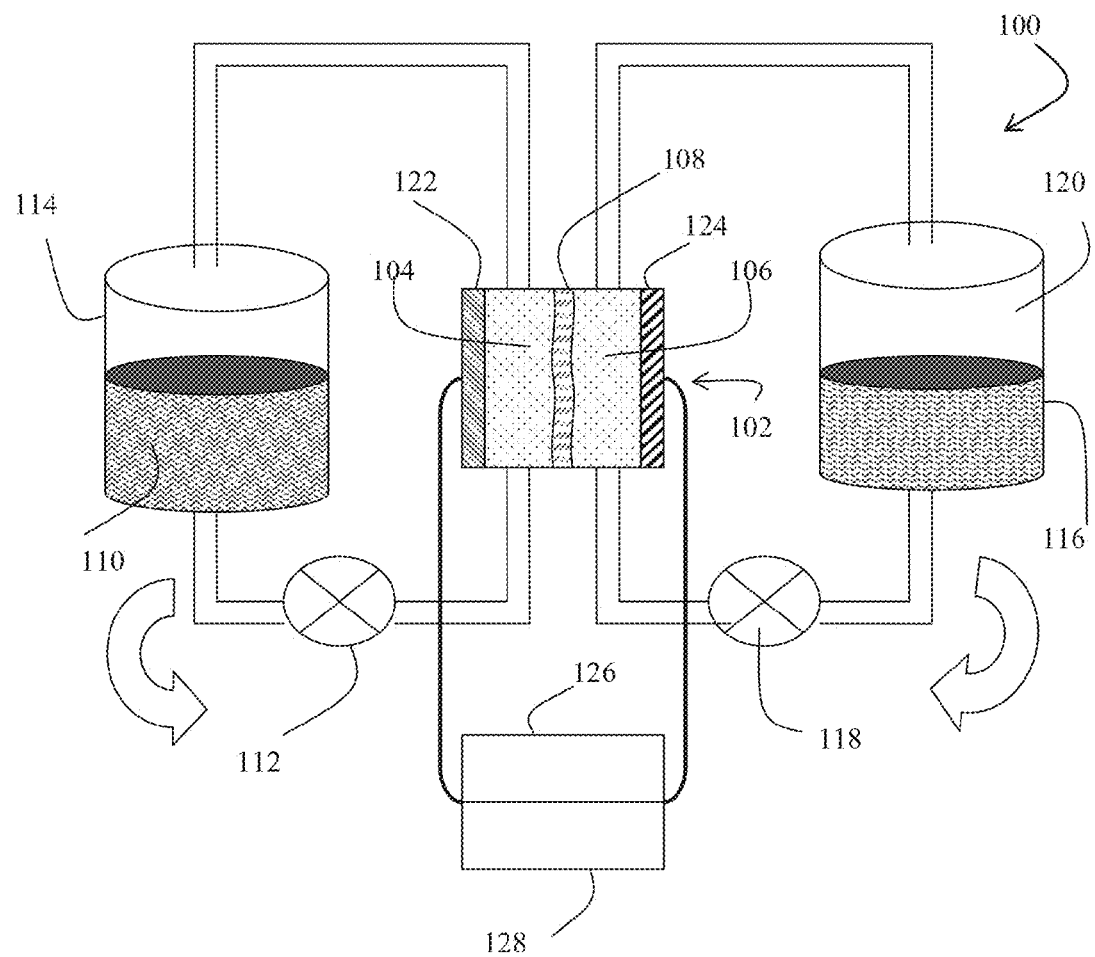
FIG. 1 is a schematic illustration of a prior art flow cell.

With reference to FIG. 1, a flow cell 100 of the prior art is shown. Flow cell 100 consists of a voltaic battery cell 102 having two half cells 104, 106 separated by an ion selective membrane 108. A first half cell 104 contains a first electrolyte solution 110 that is pumped via a pump 112 from a reservoir, or first electrolyte tank 114. A second half cell 106 contains a second electrolyte solution 116 that is pumped via a pump 118 from a second electrolyte tank 120. An anode 122 is in electrical contact to the first half cell 104, and a cathode 124 is in electrical contact with the second half cell 106. On discharge, the first electrolyte 110 is pumped from first electrolyte tank 114 by pump 112 to the first half cell 104 where electrons are stripped from, for example, metal ions (cations) of the electrolyte 110 and the valency of the cations increases. In the second half cell 106, electrons are added to, for example, metal ions, and their valency decreases. There is a net voltage between cathode 124 and anode 122 and a flow of electrons from the anode 122 to the cathode 124, which is equivalent to a conventional current from the cathode 124 to the anode 122 and this may drive a load 126 connected between the anode 122 and cathode 124, the flow cell 100, doing work thereby.

Such a flow cell 100 is somewhat inefficient. Energy is required to power the pumps 112, 118 that pump the electrolytes through the system. This energy is known as parasitic energy and lowers the efficiency of such flow cells. Flow cells 100 of this type may be recharged by connecting a power source 128 instead of a load 126. The power source 128 drives electrons through the first electrolyte 110, reducing the valency of the cathodes therein, and strips electrodes from the cations in the second electrolyte 116 increasing their valency.

Again, some of the energy of the power source 128 is required to pump the electrolytes 110, 116 through the system, and this parasitic energy loss lowers the efficiency of the fuel cell 100.

An example of a flow battery 100 of the prior art is the vanadium redox flow battery. This is based on salts in acid solution that are capable of a valence change on discharge and charge, for example, considering the charge process $V^{2+}$ to $V^{3+}$ as sulfates in the anodic half cell 104 (negative) side of the membrane 108 and $V^{5+}$ to $V^{4+}$ as sulfates in the cathodic half cell 106 (positive) side of the membrane 108. The membrane 108 is ion selective and allows, for example, sulfate ions to pass freely but prevents passage of the vanadium cations. Cell voltages are typically 1-2V on charge or discharge. Such systems promise long life, and may be cycled upwards of 5000 times. Consequently, flow batteries 100 may be used for utility applications since no conventional solid phase active materials are required for the electrodes and only solution-phase valence changes at the catalytic electrodes are involved. However conventional flow battery systems are complex as they require two pumps 112, 118 and two tanks 114, 120. Furthermore, vanadium salts are costly. Other examples of flow batteries include the polysulfide bromide battery (Regenesys) and the uranium redox flow battery.

Figure 2:
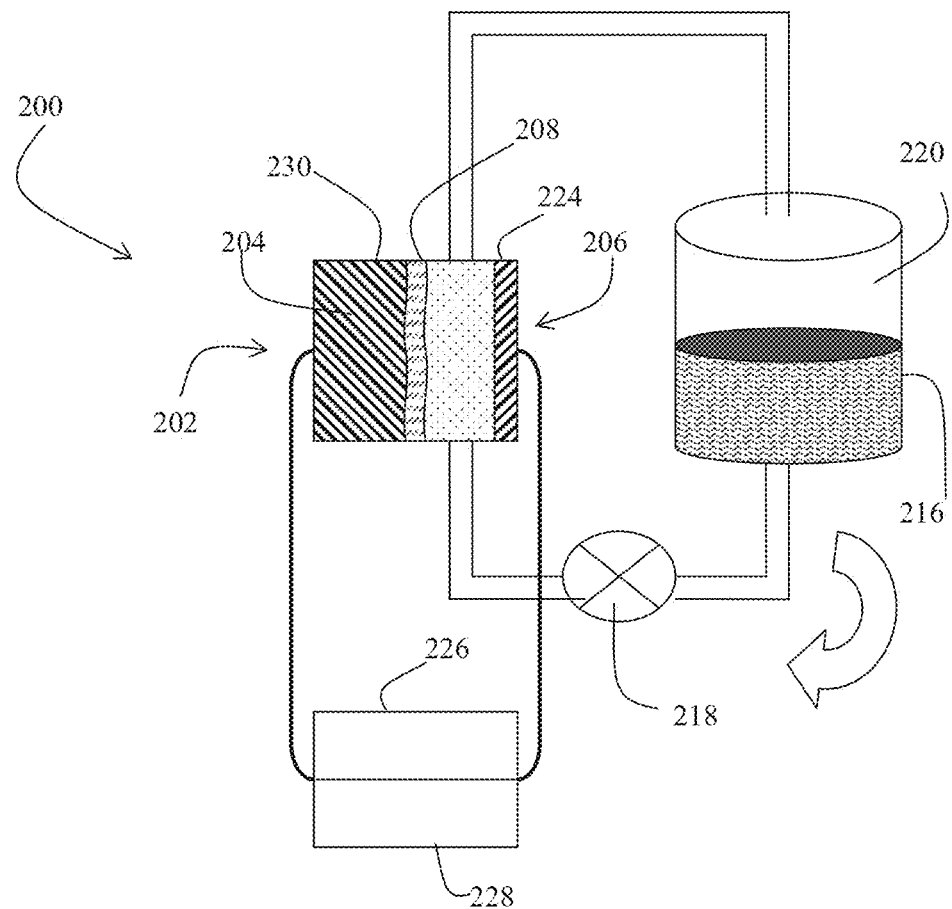
FIG. 2 is a schematic illustration of a flow cell of an embodiment of the invention.

With reference to FIG. 2, an embodiment of the present invention is directed to a novel flow battery 200 having a solid iron anode 204 in one half cell 202, an ion separation membrane 208 and an alkaline ferricyanide solution 216 together with a nickel or carbon cathode current collector 224 in the other half cell 206. The cathode current collector 224 is preferably in a form having a large surface area, such as nickel foam, carbon felt and the like, and may be coated with a catalyst, for example a layer of a transition metal oxide. The iron anode 204 may be sintered or pressed, or may be fabricated from microparticles or nanoparticles and has a large surface area. The half cell 202 is filled with an alkali solution 230 such as aqueous KOH, NaOH, LiOH or their mixtures, optionally containing sodium ferricyanide, potassium ferricyanide or their mixtures. Both iron and iron hydroxide are highly insoluble in alkali, and thus remains in solid phase in both the charge and discharge states. Consequently, the first pump 112 and the first electrolyte tank 114 or reservoir is not required. At the cathode 224, an electrolyte 216 of alkaline ferricyanide comprising aqueous KOH, NaOH, LiOH or their mixtures, also containing sodium ferricyanide, potassium ferricyanide or their mixtures is reduced to alkaline ferrocyanide and thus a storage tank 220 and pump 218 are needed. Nevertheless, the combination of iron and ferricyanide allows the use of only one pump 218 and one storage tank 220, and consequently the flow cell system 200 shown in FIG. 2 is simpler than the prior art flow cell 100 shown in FIG. 1, and the parasitic pumping energy is minimized. The charged cell may provide power to a load 226 and, during or following discharge, may receive power from an external source 228.

Iron anodes 204 are well established, and have been widely used in the rugged nickel-iron batteries of the Edison type, for example. It will be appreciated that iron is a very cost effective metal that is safe to use and has minimal environmental impact. The combination of iron 204 and alkaline ferri/ferrocyanide electrolyte 216 is commercially attractive as all the chemicals required are relatively cheap and readily available. Additionally, the iron and ferricyanide system 200 described is relatively benign. Low cost catalytic electrodes for the ferro/ferric reaction are available based on graphite or nickel materials, for example. Furthermore, unlike other anodes, the iron anode 204 has shown excellent lifetimes, well beyond 5000 cycles, which is the equivalent of a 20 year working life.

In one embodiment, the iron anode 204 is fabricated by sintering. In other embodiments, the iron electrode is manufactured by pressing. It may also use a lower cost processing technique, such as fabricating from cheap sub micron and nano iron powders at ambient temperatures. It has been found that using such powders may even improve the iron electrode rate capabilities. Suitable separators or ion selective membranes, such as those supplied commercially under the trade name Nafion by the Du Pont Company, and lower cost types are available. These can maintain separation of the ferri and ferro species and which may be wrapped around the iron anodes 204.

The cell reactions are as follows:
Half Cell Reactions
On the anode 204 (negative plate) during discharge:

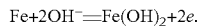

$Fe+2OH^-=Fe(OH)_2+2e$.

This reaction operates at a potential of −0.9V versus a hydrogen reference electrode.

On the cathode 224 (positive plate): $Fe(CN)_6^{3-}+e=Fe(CN)_6^{4-}$ The reaction is facilitated by the valency of iron changing from 3+ to 2+. The reaction occurs at a potential of +0.5V versus a hydrogen reference electrode.

The net reaction in NaOH electrolyte is thus:

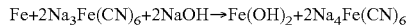

$Fe+2Na_3Fe(CN)_6+2NaOH \rightarrow Fe(OH)_2+2Na_4Fe(CN)_6$ with an open circuit cell voltage (OCV) of 1.4V Typically, the empirically measured discharge is about 1.2V and the charge is about 1.5V. If the iron electrode 204 is cycled at a medium depth of discharge, the energy efficiency may be as high as about 80%.

Iron Discharge Reaction

The iron discharge reaction cycles between a charged state—metallic iron—and a discharged state—iron hydroxide in a conducting metallic matrix, such as iron. Both iron and iron hydroxide are highly insoluble in alkali. Due to this insolubility in alkali, there is no dendrite formation. Consequently, it will be appreciated that iron is thus a preferable anode material to say, zinc, since with zinc anodes the discharge product is zinc oxide which is partially soluble in alkali and tends to not redeposit uniformly on recharge. Furthermore, the volume change difference between the two iron phases is minimal, which imparts stability to the anode and helps maintain a high cycle life.

Figure 3:
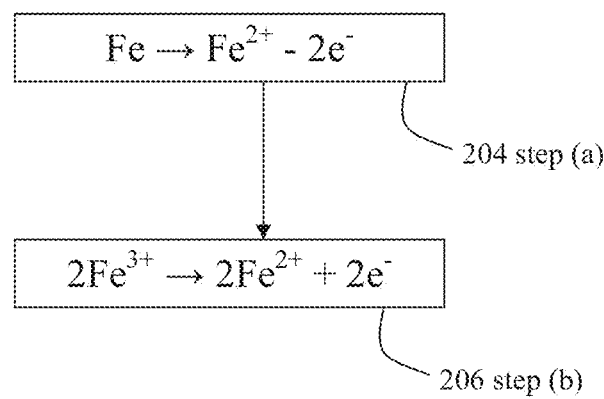
FIG. 3 is a flowchart illustrating a method of generating electricity comprising oxidizing metallic iron to iron II hydroxide at an anode of a battery and reducing ferricyanide to ferrocyanide at a cathode of the battery.

With reference to FIG. 3, a method of generating electricity using the system of FIG. 2 is shown. The method comprises steps (a) of oxidizing metallic iron to iron II hydroxide at an anode 204 of a cell 202 of a flow battery 200 and (b) of reducing ferricyanide to ferrocyanide at the cathode 206 of the battery 200. The cell 202 of the flow battery 200 may be coupled to a load 226 to do useful work.

Figure 4:
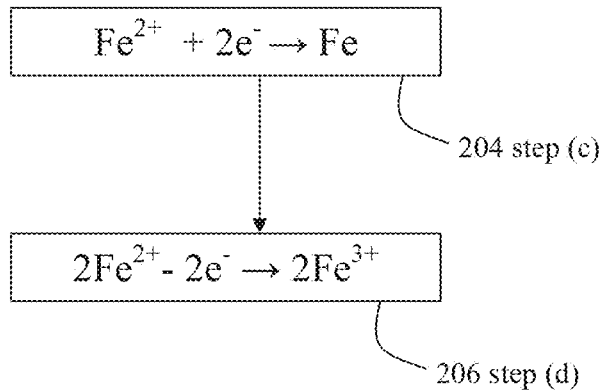
FIG. 4 is a flowchart illustrating a method of storing electricity comprising reducing iron II hydroxide to metallic iron at an anode of a flow battery and oxidizing ferrocyanide to ferricyanide at a cathode of said flow battery, thereby charging the flow battery.

With reference to FIG. 4, a method of storing electricity using the system of FIG. 2 is shown. The cell 202 of the flow battery 200 in FIG. 2 is connected to a power source 228. Energy storage comprises step (c) of reducing iron II hydroxide to metallic iron at the anode 222 of a flow battery 200 and step (d) of oxidizing ferrocyanide to ferricyanide at the cathode 224 of the flow battery 200, thereby charging the flow battery 200.

Figure 5:
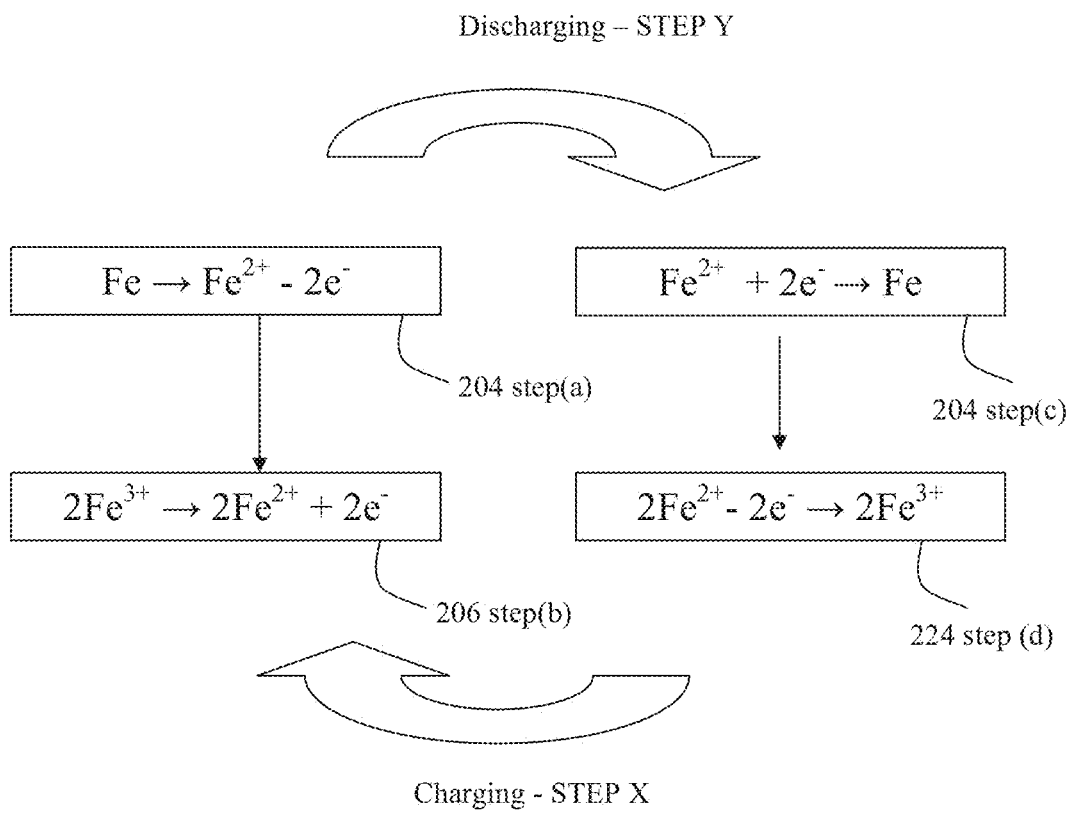
FIG. 5 is a flowchart illustrating a method of load balancing an electricity grid comprising storing excess electrical power during off-peak hours in a flow battery of FIG. 2, and releasing the electrical power during peak demand periods.

With reference to FIG. 5, a flowchart illustrating a method of load balancing an electricity grid is illustrated. The method comprises storing excess electrical power during off-peak hours in a flow battery 200 of FIG. 2 (step X) using mains power to charge the battery, and releasing the electrical power (Step Y) during peak demand periods. The iron, ferri/ferrocyanide salt and alkaline electrolyte flow battery of FIG. 2 is capable of being scaled. Relatively large power generation of say, 1 kW-1 MW and beyond, may be achieved by stacking large cells. Indeed, in a large stationary application, powers of as much as say 10 MW or more may be generated. Such applications may be used for load balancing where the battery is connected to an electrical grid to store excess electrical power during off-peak hours and to release the stored electrical power during peak demand periods.

Figure 6:
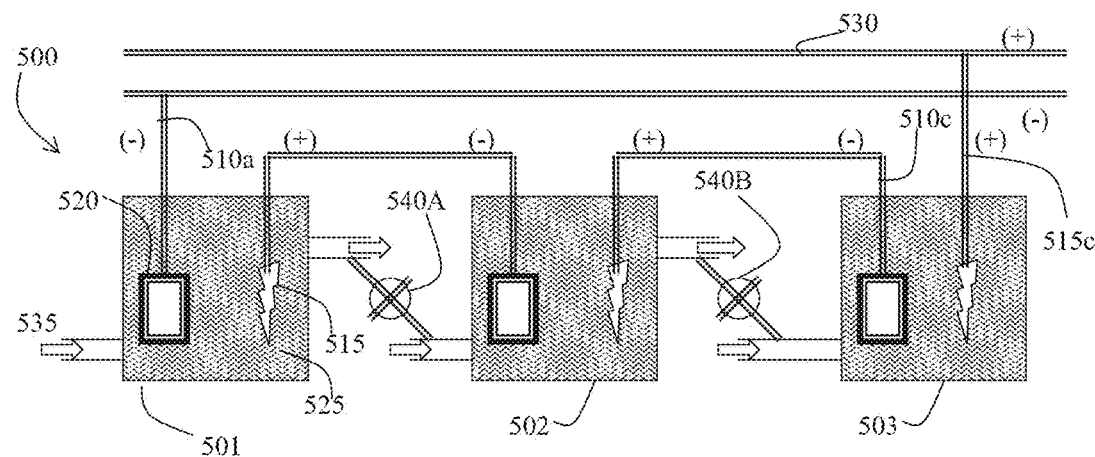
FIG. 6 shows a plurality (three) flow cells connected in series.

The flow cells of the invention may be connected in parallel or in series. With reference to FIG. 6, three flow cells connected in Series 500 are shown. This is achievable by changing the intercell electrical connections and the redox electrolyte flow route.

Three cells 501, 502, 503 are shown, each containing an iron anode (510), a separator (520), a catalytic cathode (515) and an alkaline ferricyanide redox electrolyte. The electrolyte in each cell is shown as a hydraulically separate stream, entering the first cell via pipe (535). Valves 540A, 540B maintain hydraulic independence between cells. In series illustration 500, the cells 501, 502, 503 are shown electrically connected in series with the anode lead 510c from the first cell 501 and the cathode lead 515c of the third cell 503 connected to a bus bar current takeoff system 530.

Figure 7:
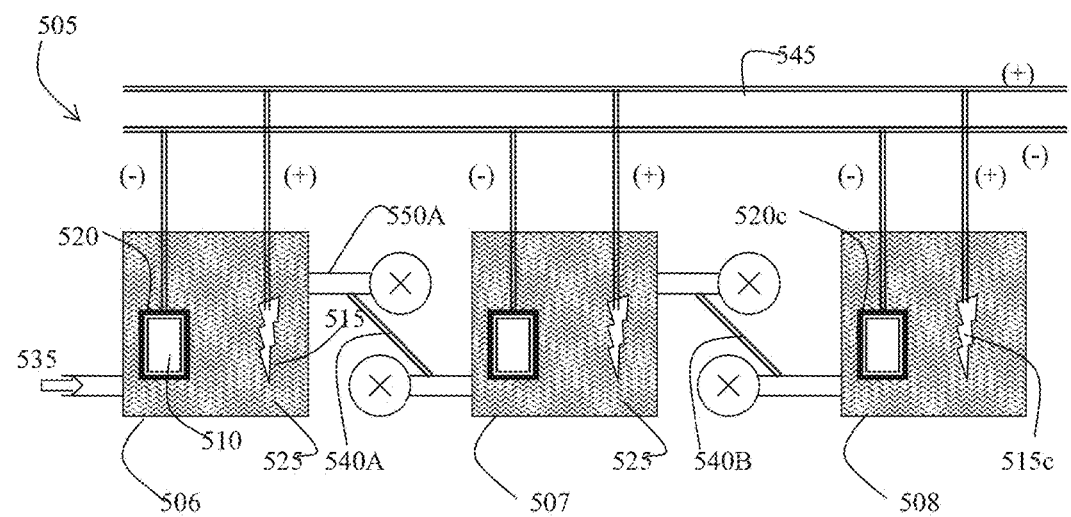
FIG. 7 shows a plurality (three) flow cells connected in parallel.

With reference to FIG. 7 a parallel arrangement 505 of three cells 506, 507, 508 is shown. Each cell consists of an iron anode 510, a separator 520, a catalytic cathode 515 and an alkaline ferricyanide redox electrolyte 525. The electrolyte 525 in each cell is shown as a hydraulically common stream, entering the first cell via pipe 535.

To allow a greater current output from the cells at reduced voltage, the parallel system 505 should be considered. The redox electrolyte flow is made to proceed from cell to cell by pipe closures such as 550A, 550B. Valves 540A, 540B are open in system 505. Electrically, each cell 506, 507, 508 is connected directly to the negative and positive parts on the bus bar current takeoff system 545.

In FIGS. 6 and 7, three cells are shown. It will, however, be appreciated that any number of cells may be coupled together in parallel or in series.

Thus another use of the cell of FIG. 2 is for power conversion using a plurality of cells of the invention, since all cells use the same electrolyte. Therefore, the electrolyte/s may be charged using a given number of cells in series and/or parallel and discharged with a different configuration of the cells in series and/or parallel. Because the voltage of the battery is proportional to the number of cells used and their series or parallel configuration, the battery can therefore act as a very powerful DC/DC converter. In practice, a number of cells or indeed all cells would typically be connected to the same storage tank of electrolyte, with the ferri/ferrocyanide salt electrolyte being pumped by a common pump.

Furthermore, in addition to being able to connect cells in parallel and in series, it will be appreciated that if the number of cells is continuously changed on the input and/or the output side, power conversion can also be from AC/DC or from DC/AC with the frequency determined by that of the switching gear.

If the number of cells is continuously changed on both the input and the output side, and two switching gears are utilized, the power conversion may also be AC/AC as a step up or step down converter.

Figure 8:
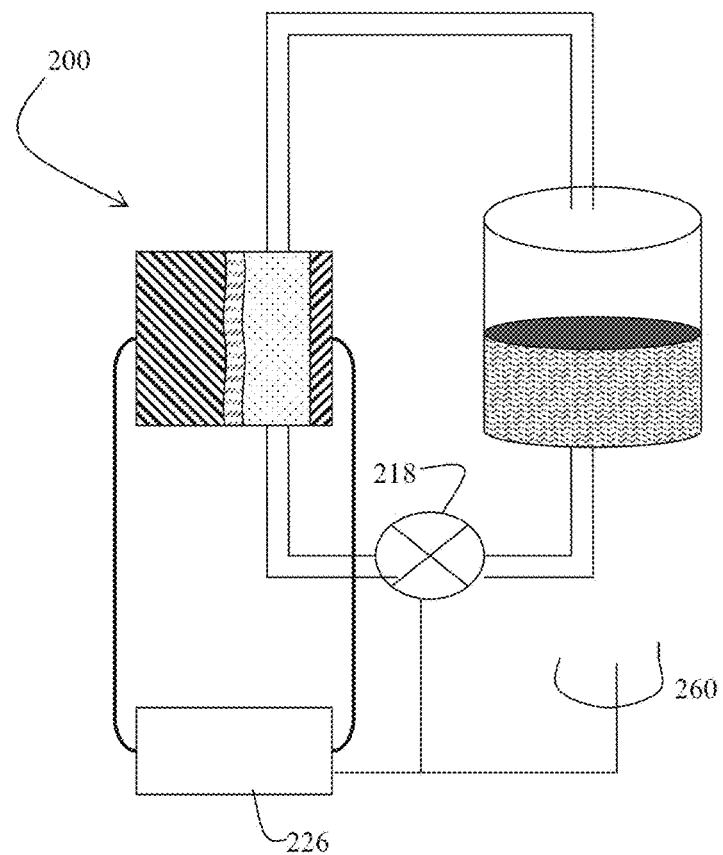
FIG. 8 shows a flow cell of FIG. 2 configured as a UPS.

Referring to FIG. 8, a flow battery 200 of the invention may be used as an uninterrupted Power Supply (UPS). This UPS is an electrical apparatus that provides emergency power to a load 226 when the input power source, typically mains power 260, fails. As shown, the flow battery 200 is coupled to a load 226 such as a computer system, for example. The load 226 is also coupled to the mains electricity supply 260 which may also power the pump 218 of the flow battery 200. The mains electricity supply 260 keeps the flow battery 200 charged. If there is a power cut, the flow battery 200 may power the load 226. Depending on the size, a flow cell as described herein may be used as a UPS for a domestic appliance such as a computer system, for critical life support systems in hospitals, for industrial equipment or for a neighborhood.

Figure 9:
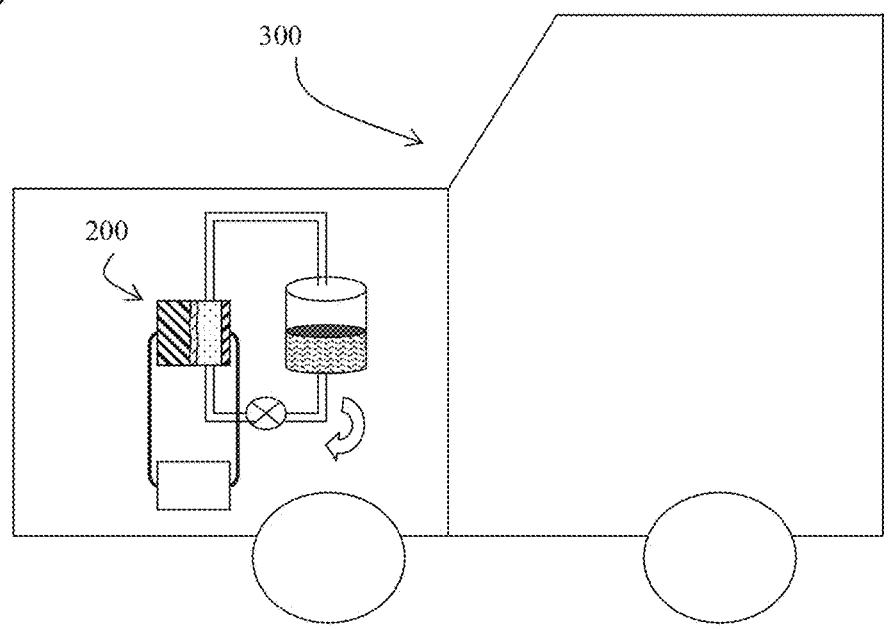
FIG. 9 shows a vehicle comprising a flow cell of FIG. 2 on a wheeled chassis.

Referring to FIG. 9, since flow batteries 200 of the invention may be rapidly "recharged" by high current charging, they can be used for powering electric vehicles 300, such as for driving a train along a railroad track or a vehicle along a road, for example.

Figure 10:
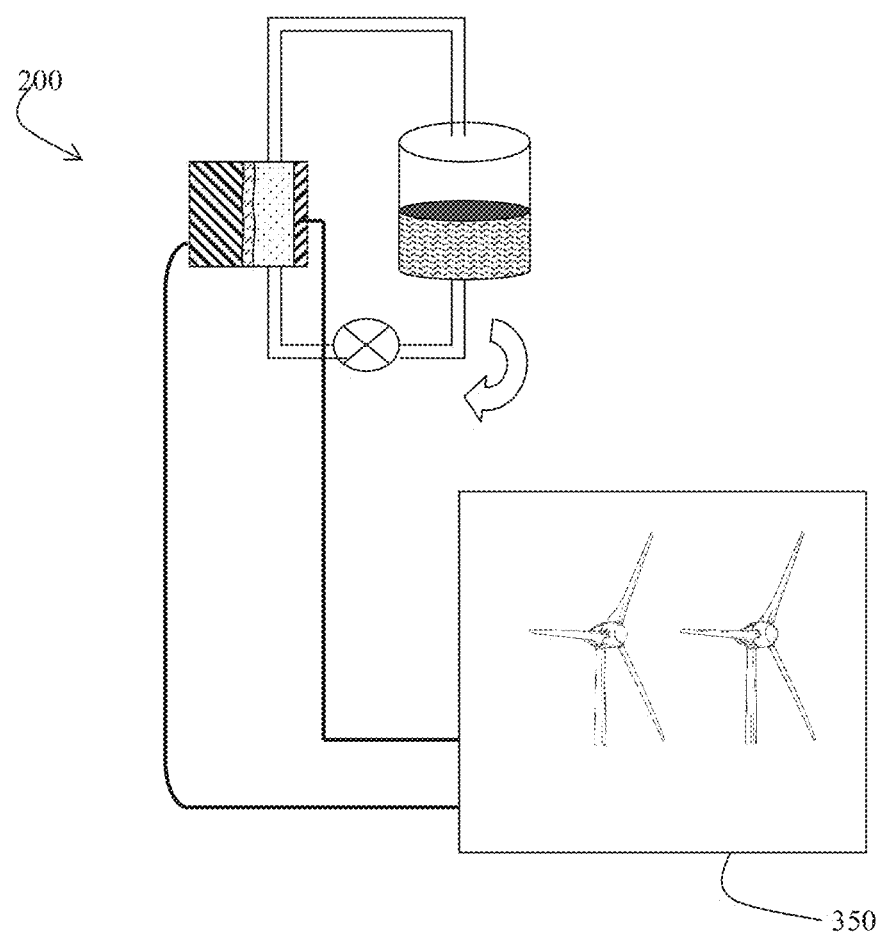
FIG. 10 shows a stand-alone power system including the voltaic power cell of FIG. 2 coupled to a wind turbine.
Figure 11:
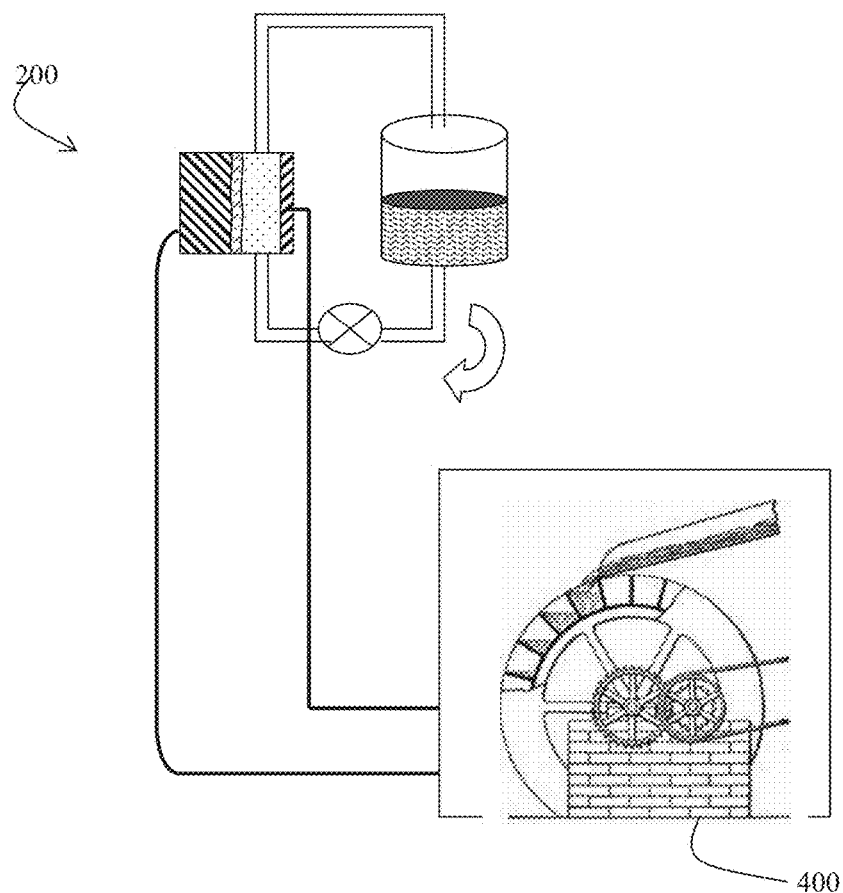
FIG. 11 shows a stand-alone power system including the voltaic power cell of FIG. 2 coupled to a hydro-powered turbine.
Figure 12:
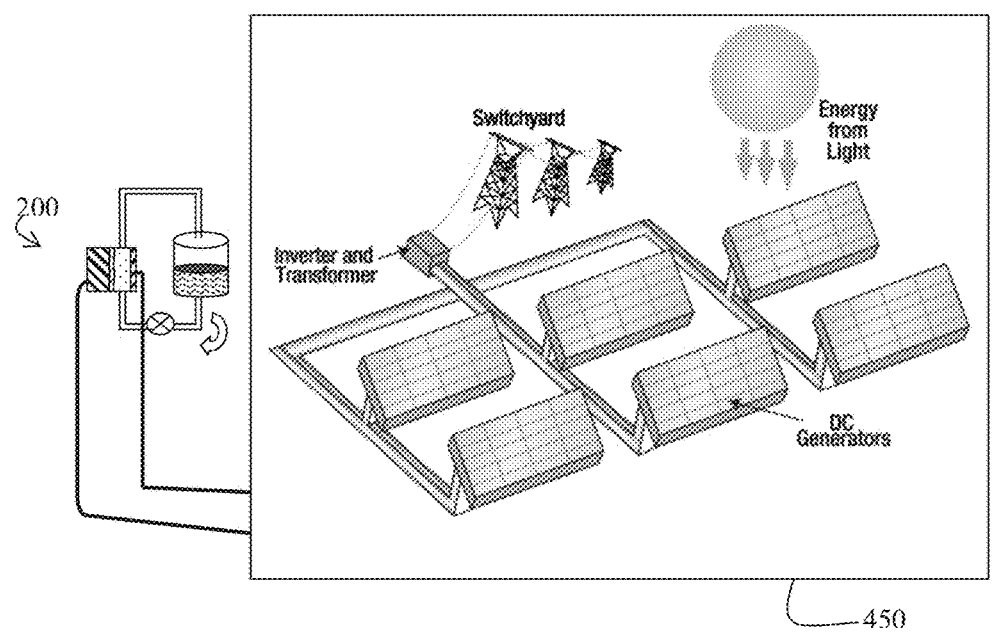
FIG. 12 shows a stand-alone power system including the voltaic power cell of FIG. 2 coupled to a solar panel array.

Other applications include storing energy from renewable sources where the battery may be used to meet spikes of demand where regular mains energy is inadequate. With reference to FIG. 10, a flow battery 200 of the invention may be coupled to a wind driven turbine system 350 to store wind generated electricity for discharge during periods of peak demand or as a stand alone electricity generation system. With reference to FIG. 11, a flow battery 200 of the invention may be coupled to a water driven turbine 400 to store hydroelectricity for discharge during periods of peak demand or as a stand alone electricity generation system. With reference to FIG. 12, a flow battery of the invention may be coupled to a solar power plant 450 or to a solar panel array, to store solar generated electricity for discharge during periods of peak demand or as a stand alone electricity generation system.

The flow battery 200 of the invention may be used as a stand-alone power system. By way of example only, one such application is in the telecommunications industry for use in cell-phone base stations where no grid power is available. Such a battery may be used alongside a solar or a wind power to compensate for their fluctuating power levels and alongside a generator to make the most efficient use of it to save fuel.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. A method of storing electricity by charging a redox battery cell, having a cathode half cell and an anode half cell ionically coupled by a semi-permeable membrane, said anode (on charging) half cell including ferrocyanide in a first alkaline solution, and said cathode (on charging) half cell comprising a solid metal iron electrode together with iron hydroxide in contact with a second alkali solution formulated so that said iron and iron hydroxide cathode is substantially insoluble therein, said method comprising providing a flow of conventional electricity via an external circuit to the cathode, thereby providing a flow of electrons to said anode, reducing iron hydroxide to metallic iron at the cathode of the flow battery with said flow of electrons and oxidizing ferrocyanide to ferricyanide at the anode of said flow battery by said flow of electricity extracting electrons from the anode, thereby charging said redox battery cell.

2. A redox battery cell arranged to provide electricity to an external load, and having a cathode half cell and an anode half cell ionically coupled by a semipermeable membrane said cathode half cell including ferricyanide in a first alkaline solution in contact with a cathode current collector, and said anode half cell comprising a solid phase metal iron electrode in contact with a second alkali solution formulated so that said iron-metal electrode is substantially insoluble therein and is converted to insoluble iron-hydroxide on discharging, wherein on discharge, the metal iron of the anode first electrode is oxidizable into iron hydroxide, and the ferricyanide of the cathode second electrode is reducible into ferrocyanide by the electro-chemical reaction:

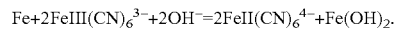

$Fe + 2FeIII(CN)_6^{3-} + 2OH^- = 2FeII(CN)_6^{4-} + Fe(OH)_2$.

3. The redox cell of claim 2, wherein the cathode current collector comprises an inert catalytic porous structure.

4. The redox cell of claim 2, wherein the cathode current collector is selected from the group consisting of nickel and carbon.

5. The redox cell of claim 2, wherein the second alkali solution is selected from the group consisting of aqueous NaOH, KOH, LiOH and their mixtures.

6. The redox cell of claim 2, wherein ferricyanide ions are provided by mixing an aqueous alkali selected from the group consisting of KOH, NaOH and LiOH together with a ferricyanide selected from the group consisting of sodium ferricyanide and potassium ferricyanide.

7. The redox cell of claim 2, wherein iron is oxidizable to iron hydroxide and the ferricyanide is reducible to ferrocyanide by passing a discharging current through said redox cell.

8. The redox voltaic cell of claim 2 further comprising a pump and storage tank for pumping and storing at least one of the group comprising ferricyanide and ferrocyanide solutions and their mixtures, and said voltaic cell is thereby configured as a flow cell.

9. The redox cell of claim 8, wherein the storage tank is separated into two compartments by a dividing wall that allows delivery of ferricyanide solution to the cell and receipt of ferrocyanide solution from the cell while keeping the ferricyanide and ferrocyanide solutions separate.

10. A battery comprising a plurality of redox cells of claim 2 arranged in series and/or in parallel.

11. The battery of claim 10 comprising different series parallel configurations of redox cells on charge and discharge, said battery for power conversion between one voltage and another voltage.

12. The battery of claim 10 further comprising at least one pump and at least one storage tank for pumping and storing ferricyanide and/or ferrocyanide solutions.

13. The battery of claim 10 configured as a DC/DC power converter.

14. The battery of claim 10 further comprising a switching gear and configured as one of the group consisting of AC/DC, AC/AC and DC/AC converters.

15. The redox battery cell of claim 2, wherein said semi-permeable membrane is configured to allow transfer of certain sodium, potassium, lithium, or hydroxide ions while substantially preventing passage of ferrocyanide and ferricyanide ions.

16. A process for discharging a redox battery to provide electrical current to an external load coupled across said half cells, said battery including an anode half cell and a cathode half cell, both said half cells ionically coupled by a semi-permeable membrane, said process comprising the steps of:
a) oxidizing a solid iron metal electrode of said anode half cell into insoluble iron hydroxide in an alkaline environment;
b) simultaneous to step (a), reducing ferricyanide of the cathode half cell to ferrocyanide in an alkaline environment; and,
c) providing electrical current to said external load coupled between said half cells
wherein on discharge, the metal iron of the anode first electrode is oxidizable into iron hydroxide, and the ferricyanide of the cathode second electrode is reducible into ferrocyanide by the electro-chemical reaction:

$$Fe + 2FeIII(CN)_6^{3-} + 2OH^- = 2FeII(CN)_6^{4-} + Fe(OH)_2.$$

17. The process of claim 16, wherein said semi-permeable membrane is configured to allow transfer of certain sodium, potassium, lithium, or hydroxide ions while substantially preventing the passage of ferrocyanide and ferricyanide ions.

* * * * *